(12) United States Patent
Snowdon

(10) Patent No.: US 7,833,318 B2
(45) Date of Patent: Nov. 16, 2010

(54) CONTAINER

(75) Inventor: Brian Snowdon, Tickhill (GB)

(73) Assignee: Inbulk Technologies Limited, Glasgow (GB)

( * ) Notice: Subject to any disclaimer, the term of this patent is extended or adjusted under 35 U.S.C. 154(b) by 394 days.

(21) Appl. No.: 11/911,932

(22) PCT Filed: Apr. 19, 2006

(86) PCT No.: PCT/GB2006/001399

§ 371 (c)(1),
(2), (4) Date: Dec. 27, 2007

(87) PCT Pub. No.: WO2006/111725

PCT Pub. Date: Oct. 26, 2006

(65) Prior Publication Data

US 2008/0210093 A1    Sep. 4, 2008

(30) Foreign Application Priority Data

Apr. 22, 2005    (GB)    ................................ 0508113.8

(51) Int. Cl.
*B01D 50/00*    (2006.01)
(52) U.S. Cl. .............................. 95/273; 406/34; 406/42; 406/43; 406/192; 406/197; 406/198; 141/1; 141/67; 141/286; 55/385.1
(58) Field of Classification Search ................ 55/385.1, 55/385.4, DIG. 32, DIG. 34; 406/34, 42, 406/43, 192, 198, 197; 137/14, 115.13, 115.26, 137/489.5, 494, 906; 222/181.1, 181.3; 95/273; 141/1, 67, 286
See application file for complete search history.

(56) References Cited

U.S. PATENT DOCUMENTS

| | | | | |
|---|---|---|---|---|
| 4,017,281 A | * | 4/1977 | Johnstone | ..................... 55/334 |
| 4,274,961 A | * | 6/1981 | Hirs | ........................... 210/225 |
| 4,695,205 A | * | 9/1987 | Levine | ........................ 406/38 |
| 5,351,630 A | * | 10/1994 | Lister et al. | ............. 110/165 A |
| 5,529,222 A | * | 6/1996 | Toth et al. | ................. 222/181.3 |
| 6,186,654 B1 | * | 2/2001 | Gunteret et al. | ............... 366/18 |
| 6,343,896 B1 | * | 2/2002 | Goodier et al. | ............... 406/43 |
| 6,350,086 B1 | * | 2/2002 | Dibble et al. | ............... 406/197 |
| 6,972,114 B2 | * | 12/2005 | Pope et al. | ................... 422/139 |
| 7,337,926 B2 | * | 3/2008 | LeRoy | ..................... 222/181.1 |
| 7,597,506 B2 | * | 10/2009 | Snowdon | ...................... 406/39 |

FOREIGN PATENT DOCUMENTS

WO    WO-2004/054899 A    7/2004

OTHER PUBLICATIONS

International Search Report of PCT/GB2006/001399.
Written Opinion of the International Searching Authority for PCT/GB2006/001399.

* cited by examiner

*Primary Examiner*—Duane Smith
*Assistant Examiner*—Minh-Chau Pham
(74) *Attorney, Agent, or Firm*—Ryan A. Schneider, Esq.; Troutman Sanders LLP

(57) ABSTRACT

Containers, particularly to containers for storing dry granules and powders, for examples silos. A container can include an air filter for cleaning the air that pneumatically conveys bulk product into the container. A valve can be used to restrict the air flow through the air filter, thereby elevating the pressure within the container to above atmospheric pressure.

22 Claims, 3 Drawing Sheets

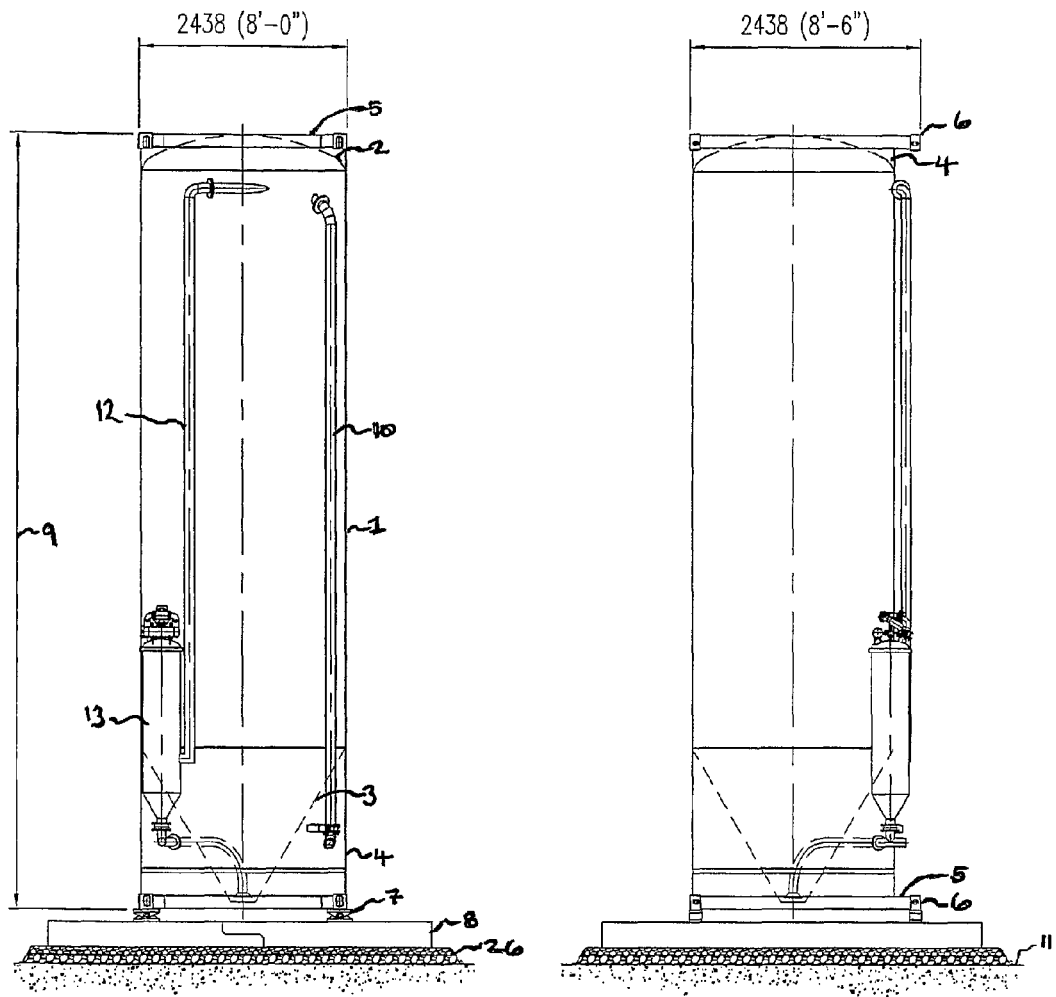
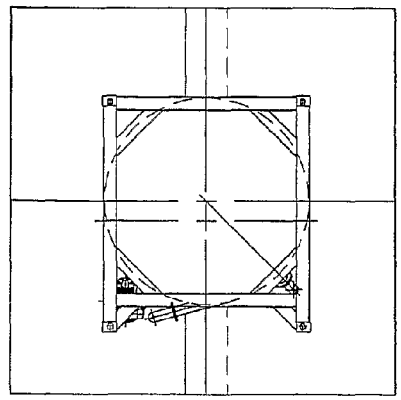
Fig 1

CONTAINER

BENEFIT CLAIMS

This application is a U.S. National Stage of International Application No. PCT/GB2006/001399, filed 19 Apr. 2006, which claims the benefit of GB 0508113.8, filed 22 Apr. 2005.

FIELD OF THE INVENTION

The invention relates to containers, particularly to containers for storing dry granules and powders, for examples silos.

BACKGROUND TO THE INVENTION

Transportable silos for dry granules and powders that are filled by pneumatic tank trucks after installation have been known for many years. They consist of a thin metal silo which is designed to hold the bulk powder or granular product. A fixed tanker unloading pipe extends from near ground level to the silo top. A flexible hose is connected between the pneumatic tank truck and the tanker unloading pipe and the tank is then pressurised to pneumatically convey the contents of the truck in the silo. Pneumatic tank trucks are designed to operate at either 1 bar(g) or 2 bar(g).

The air used for transporting the bulk material into the silo is in most cases vented to atmosphere through a self cleaning filter unit mounted on the silo roof. In some cases this filter unit is mounted at ground level and a duct connects the filter to the top of the silo. During unloading, there is a small pressure drop as the conveying air is pushed through the filter and for this reason the silo is designed to take a small positive pressure of typically 0.02 to 0.05 bar(g).

To enable the truck operator to know when the silo is full, a level probe is fitted at the highest acceptable material level in the silo. The silo may also be mounted on load cells so that the amount of bulk product in the silo is known. An alternative to the load cells is to fit a number of level probes at different levels in the silo so that the user can see when the silo is ½ full, ¼ full for example.

To enable the user to install and service the equipment such as the filter unit and level probes, an access ladder is provided from ground level to the silo top and the silo will have handrails and a standing area on the silo top for the safety of maintenance personnel.

The conveying air filtration unit has to be sized to take the flow of air during unloading of the product and also a very high airflow which comes from the tanker truck as the tanker truck becomes empty and the compressed air in the tanker truck vents down the now empty conveying pipe into the silo. Typical cloth filter areas required to cope with this are between 20m² and 30m². With this cloth area, the filter units are quite large.

Even though the silo may be a temporary one, it has to be installed on prepared concrete foundations that can take the static loads and overturning wind loads. This results in high cost even for a temporary silo installation.

Small temporary silos of this type will typically hold 20 to 50 tonnes of product. The silo is simply a holding device. If the material in the silo has to be moved some distance to the point of use, mechanical or pneumatic conveying systems must be installed under the silo outlet to move this material.

Because of the need for prepared foundations and the construction of onward conveying systems, the 'temporary' silo arrangement can be expensive to install and takes at least 3 to 4 days to complete after foundations have been completed. This adds to the total project cost. Planning permission may also be required for this fixed installation which could take many months to get.

Transportable silos are normally constructed with 4 support legs with cross bracing. They may be moved to site on one or more lorries and assembled at site. Whenever they are lifted, a crane or cranes are required with lifting chains or slings. Ladder and filter units are easily damaged and these silos cannot be moved on intermodal transport such as that used for containers or lifted with container handling devices.

The vessel of the present invention overcomes many of the problems associated with temporary or portable silos. Reference will be made to a type of silo which is mounted in, or capable of being mounted in, an ISO frame, such a vessel is referred to herein as an ISO-Silo™.

STATEMENTS OF THE INVENTION

An advantageous feature of this invention is the use of a self cleaning air filter which operates under pressure during truck unloading, thereby reducing the filter area required. This can be achieved because the airflow from the tanker truck can be restricted at the filter outlet so that the pressure in the filter and silo rises to approximately half the tanker truck pressure. Filters of the type used for the truck unloading are fabric and are designed to have a maximum flow through each m² of fabric based on filtration velocity. A typical filtration velocity being 1.5 m³/min/m² of filter area for most powders. If the pressure in this filter is raised to 1 bar(g) for example, the amount of free air that this filter can pass is doubled because the air volume is halved if the absolute gas pressure is raised from 1 bar(a) to 2 bar(a), the effect of this being that the filter area can be halved. By restricting the air flow through the filter, the surge of airflow at the end of the truck unloading can also be avoided and this factor can also be used to further reduce the filter area. The net result being a filter of approximately ⅓ the filter area of a conventional silo. The result of this is that a filter of physically small size can now be used to vent the conveying air.

Thus according to an aspect of the invention there is provided a vessel for storing a bulk product, the vessel comprising an air filter for cleaning the air which pneumatically conveys the bulk product into the vessel wherein a means for restricting the air flow through the air filter is provided thereby elevating the pressure within the vessel to above atmospheric pressure.

Preferably the means for restricting the air flow is located at the outlet of the air filter. Even more preferably this restricting means is a valve.

The bulk product is conveyed into the vessel from a container and preferably the pressure within the vessel is at least 50% of the pressure of the container.

Even more preferably the vessel is pressurised to between about 1 to 2 bar(g).

In a preferred embodiment of the invention the vessel is a silo and the container is a pneumatic tanker truck.

Most silos that are filled by pneumatic delivery truck or 'tanker' have the air filter mounted on to the roof of the silo. Any dust collected during an unloading falls back into the silo during unloading.

An objective in the design of the ISO-Silo™ is to position the smaller air filter at ground level in order to avoid the need to provide maintenance access to the ISO-Silo™ top. Therefore in a preferred embodiment of the invention the air filter is positioned on a side wall of the silo. Even more preferably the air filter is positioned within the lower half of the side wall.

Even more preferably still the air filter is positioned at or near ground level when the silo is in use.

Normally a ground level filter would require a relatively large duct typically 200 mm to 300 mm diameter to carry the air and dust to the ground level mounted air filter which would have a bucket underneath to catch the dust from the filter. The ISO-Silo™ filter is provided with a much smaller pipe or duct, typically 100 mm diameter, due to the fact that it operates under pressure and has a flow limiting restriction on the filter outlet. To avoid the need to empty a bucket or container after the tanker unloads, the ISO-Silo™ filter may discharge its collected dust into the pneumatic transport pipe at the end of the truck unloading. This can be achieved because the filter unit is itself a pressure vessel. Compressed air can be applied to the filter to clean the filter and at the same time push collected dust into the pneumatic transport pipe.

The user may also want to be able to determine the level of the bulk product within the silo. There is therefore preferably provided a means for detecting the level of bulk product. Such a detecting means may for example be a level probe. A number of level probes can be positioned at different levels on the silo so that the user can see when the silo is ½ full, ¼ full etc . . . . In order to avoid having to fit a high level probe in the top of the ISO-Silo™, a level probe may be mounted in the small hopper underneath the filter unit which is at ground level. If the ISO-Silo™ becomes 'overfilled' by accident, the bulk material being unloaded will be conveyed down the vent pipe into the filter unit hopper. This level probe will automatically close the airflow valve at the filter outlet and will stop any further transport from the tanker truck. This is not a normal situation and would only occur if the ISO-Silo™ is overfilled.

Alternatively or additionally load cells may be fitted between the ISO-Silo™ and the base, for example a concrete base on which it rests when in use.

With the location of the air filter and detecting means at or near to ground level there is no requirement for an access ladder or handrails on top of the silo.

In a further preferred embodiment of the invention after being filled by a pneumatic truck, the ISO-Silo™ itself can be pressurised to become a pneumatic conveying system that can convey either the powder or granular material to the point of use within a factory for example, thus avoiding the need for an additional transporting system that would be required with a conventional silo.

For applications where it is not necessary to transport the material more than a few meters from the base of the ISO-Silo™, a short screw conveyor can be located at the base of the silo as an alternative. The filter unit will be located above the screw conveyor as it exits the base of the silo and the screw conveyor will be capable of being pressurised. It may have a valve on its outlet which will be closed during ISO-Silo™ filling. The dust collected in the filter unit will fall into the screw conveyor when tanker truck unloading is completed and the screw conveyor begins to operate.

According to a further aspect of the invention there is provided an air filter for use on a vessel into which a bulk product is pneumatically conveyed, said air filter being provided with means of restricting the air flow through the filter, thereby resulting in an elevation of pressure within the vessel to above atmospheric pressure.

In a preferred embodiment of the invention the air filter is for use on a silo.

A further object of the invention is to provide a transportable container silo or ISO-Silo™ that overcomes problems associated with the prior art. Therefore according to a further aspect of the invention there is provided a kit comprising a vessel, an ISO frame and a pre-cast concrete base.

The silo is preferably cylindrical and fits within the envelope of a standard ISO container according to the tank container standard ISO 1496-3:1995. The ISO-Silo™ can therefore be transported intermodally on trucks, road or sea by using the infrastructure and equipment used throughout the world to lift and move ISO containers.

When the ISO-Silo™ reaches its final destination, it is lifted vertically by a crane onto a concrete base. To avoid having to prepare concrete foundations to spread load and prevent overturning with wind, the ISO-Silo™ uses a pre-cast concrete base which arrives on site in two pieces so that it can be moved on a standard road vehicle or put inside a small standard ISO box type container. This base is designed with a large surface area to reduce ground load and is also designed to prevent overturning due to wind. This base can be placed very quickly onto a simple 'hardcore' bed of aggregate by the same crane used to lift the ISO-container upright onto the base.

The smaller filter according to the invention can be located within the space available between the cylindrical vessel and the rectangular shape of the ISO container sized end frames so that it does not protrude beyond this and can be mounted on the ISO-Silo™ during transport.

According to a further aspect of the invention there is provided a method of filtering the air displaced after a bulk product has been pneumatically conveyed into a vessel, said method comprising the step of;

restricting the air flow through the air filter thereby elevating the pressure in the vessel to above atmospheric pressure.

DESCRIPTION OF THE DRAWINGS

FIG. 1 shows two elevations and a plan of an ISO-Silo™ installed on its foundations.

DETAILED DESCRIPTION OF THE INVENTION

Figure 2:
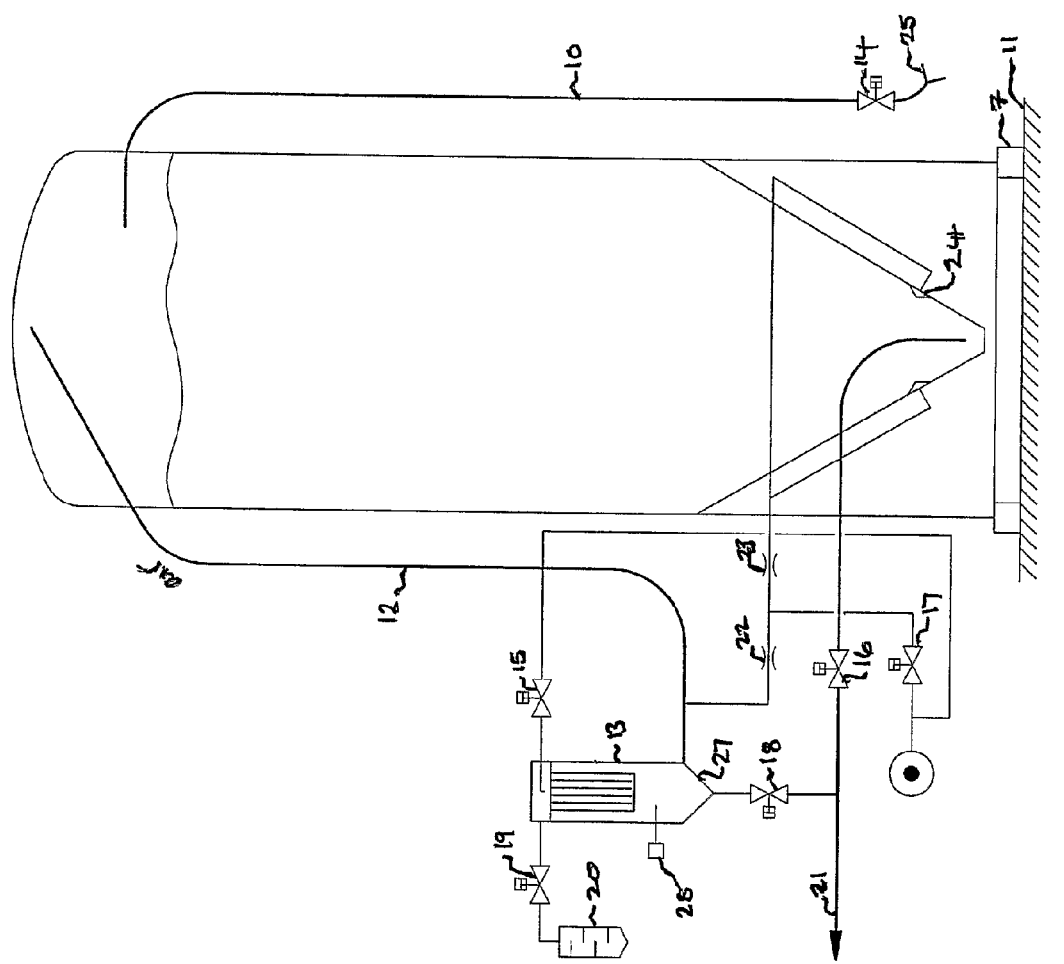
FIG. 2 shows a schematic arrangement on an ISO-Silo™ of the invention and the associated pipework.

The present invention will now be described in further detail, with reference to the accompanying drawings.

Referring to FIG. 1 of the accompanying drawings, a cylindrical pressure vessel 1 has a domed upper end 2 and a lower conical discharge section 3 which lies within extensions 4 to the vessel 1. Vessel 1 has end frames 5 which are dimensioned to comply with standard ISO container design codes. Corner blocks 6 are used to lift and locate the ISO-Silo™ on container handling equipment. The complete assembly is mounted on load cells 7 which are fixed to base 8 which is on top of hardcore 26.

The height 9 of the unit can be any standard container length for example 20 ft, 30 ft or 40 ft.

Tanker filling pipe 10 extends from near ground level 11 to the top of the vessel. Venting pipe 12 takes vented air from the vessel top to the venting filter 13 located near ground level.

Referring to FIG. 2 of the accompanying drawings, the filling operation of the ISO-Silo™ consists of attaching a hose from a pneumatic tank truck onto the filling pipe connection 25 and opening valves 14 and 15. Valves 16, 17 and 18 are closed. The conveyed material from the tanker truck enters the ISO-Silo™ and separates from the airstream by using a tangential entry at the top of the ISO-Silo™. The conveying air vents through pipe 12 to the filter 13. Clean air is vented from this filter through valve 19 and through silencer 20. Valve 19 has a restricted size which causes pressure to build up in the ISO-Silo™ during unloading to approximately 1 bar(g). The further effect of the restriction in valve 19 is to restrict the air flow through the filter so that the filter can be smaller in filter area and physical size. During the filling process, dust collect s in filter hopper 27 and the filter elements are cleaned by jets of high pressure compressed air which is directed periodically in to the filter 13 by opening valve 15 for short periods. This filter cleaning method is a well known concept. Level probe 28 will warn the operator that the ISO-Silo™ has become overfilled should this occur.

When the truck becomes empty, the normal rush of compressed air into the receiving silo will not occur since the ISO-Silo™ is already at some pressure and the airflow through the filter 13 is restricted. To depressurise the truck, the air flow to the truck is stopped and the compressed air in the truck and ISO-Silo™ will vent through filter 13 until the pressure is atmospheric. After filling, the ISO-Silo™ can now become a pneumatic conveying vessel in which bulk material is conveyed through pipe 21 to the point of use which may be some distance from the ISO-Silo™ and could be several hundred meters away.

To operate as a pneumatic conveying system, the ISO-Silo™ is pressurised by opening valve 17 valves 14, 16 and 18 will be closed. Orifices 22 and 23 control the distribution of air between the top of the vessel and the fluidising devices 24 around the cone of the vessel. When a suitable pressure has been reached, valve 18 opens for a short period of a few seconds to discharge the collected dust in hopper 20 into the conveying pipe 21. When valve 18 has closed, valve 16 opens, allowing the contents of the ISO-Silo™ to be fully or partly conveyed to the point of use. Load cells 7 will advise the user when the ISO-Silo has become empty.

Figure 3:
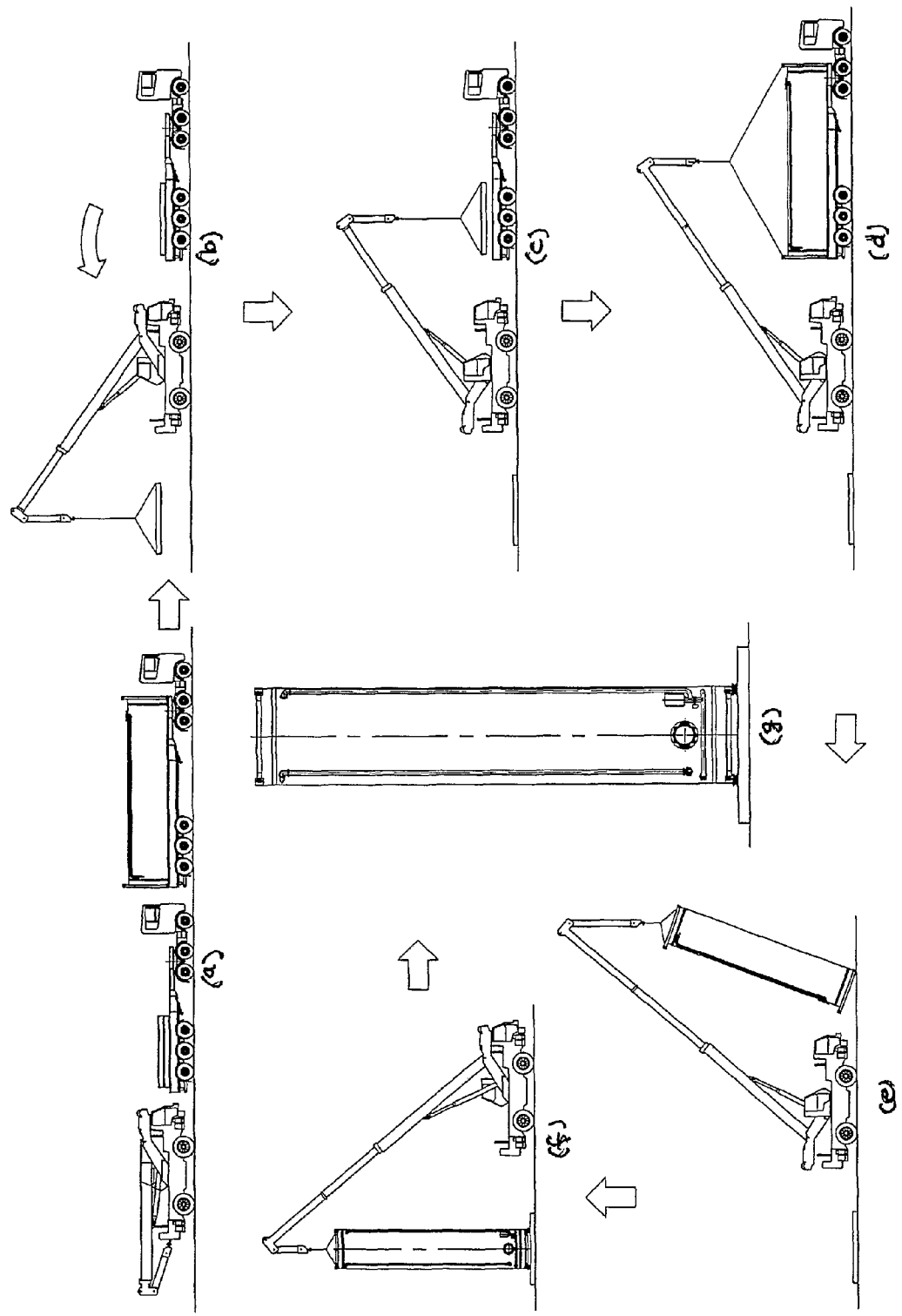
FIG. 3 shows the method of transportation, offloading and installation of an ISO-Silo™ of the invention.

FIG. 3 of the accompanying drawings, shows stages of transport and erection of the ISO-Silo™. FIG. 3(*a*) shows the transport method and crane used for erection. FIG. 3(*b*) and FIG. 3(*c*) show the base being loaded onto a hardcore bed. FIGS. 3(*d*), (*e*) and (*f*) show the method of lifting the ISO-Silo™ from a trailer onto the base. FIG. 3(*g*) shows the completed ISO-Silo™ fixed to the base.

The invention claimed is:

1. A vessel for storing a bulk product, the vessel comprising an air filter for cleaning the air which pneumatically conveys the bulk product from a container into the vessel, wherein a means for restricting the air flow through said air filter is provided thereby elevating the pressure within the vessel and the filter to above atmospheric pressure, and wherein the pressure inside the vessel is at least 50% of the pressure inside of the container from which the bulk product is conveyed.

2. A vessel according to claim 1, wherein the means for restricting the air flow is located at the outlet of the air filter.

3. A vessel according to claim 1, wherein the means for restricting the air flow is a valve.

4. A vessel according to claim 1, wherein the vessel is pressurised to between about 1 to 2 bar(g).

5. A vessel according to claim 1, wherein the vessel is a silo.

6. A vessel according to claim 1, wherein the container is a pneumatic tanker.

7. A vessel according to claim 1, wherein the air filter has a maximum flow velocity of 1.5 $m^3/min/m^2$.

8. A vessel according to claim 1, wherein the air filter is positioned on a side wall of the vessel.

9. A vessel according to claim 8, wherein air filter is positioned within the lower half of the side wall.

10. A vessel according to claim 8, wherein the air filter is positioned substantially at or near ground level when the vessel is in use.

11. A vessel according to claim 1, wherein the vessel is adapted to pneumatically discharge the bulk product from the vessel.

12. A vessel according to claim 11, wherein a screw conveyor is connected to the vessel for discharging the bulk product under pressure from the vessel.

13. A vessel according to claim 1, wherein a means for detecting the level of bulk product within the vessel is provided.

14. A vessel according to claim 13, wherein the detecting means is at least one level probe or load cell.

15. A vessel according to claim 1, wherein the bulk product is a powder or granular product.

16. A vessel according to claim 1, wherein the vessel has a fluidisable base.

17. A vessel according to claim 1, wherein the vessel is located within an ISO frame.

18. A kit comprising a vessel according to claim 1, an ISO frame and a pre-cast concrete base.

19. An air filter for use on a vessel into which a bulk product is pneumatically conveyed from a container, said air filter being provided with means for restricting the air flow through the filter, thereby resulting in an elevation of pressure within the vessel and the filter to above atmospheric pressure, and wherein the pressure inside the vessel is at least 50% of the pressure inside of the container from which the bulk product is conveyed.

20. An air filter according to claim 19, wherein the means of restricting the air flow is a value located at the outlet of the air filter.

21. An air filter according to claim 19, wherein the vessel is a silo.

22. A method of filtering the air displaced after a bulk product has been pneumatically conveyed from a container into a vessel, said method comprising restricting the air flow through the air filter thereby elevating the pressure in the vessel and the filter to above atmospheric pressure, and maintaining the pressure inside the vessel at at least 50% of the pressure inside of the container from which the bulk product is conveyed.

\* \* \* \* \*